(12) United States Patent
Monck

(10) Patent No.: US 6,243,959 B1
(45) Date of Patent: *Jun. 12, 2001

(54) MEASURING AND INSTRUCTIONAL RULER

(76) Inventor: Donna L. Monck, 545 Carpentersville Rd., Phillipsburg, NJ (US) 08565

( * ) Notice: Subject to any disclaimer, the term of this patent is extended or adjusted under 35 U.S.C. 154(b) by 0 days.

This patent is subject to a terminal disclaimer.

(21) Appl. No.: 09/270,919

(22) Filed: Mar. 16, 1999

Related U.S. Application Data (63) Continuation-in-part of application No. 08/812,529, filed on Mar. 7, 1997, now Pat. No. 5,881,469.

(51) Int. Cl.⁷ .............. G01B 3/02; G09B 19/02; G09B 23/02
(52) U.S. Cl. ............ 33/494; 33/491; 33/1 SD; 434/195; 434/304
(58) Field of Search ................ 33/483, 1 B, 1 F, 33/1 N, 1 V, 1 AA, 1 BB, 1 SB, 1 SD, 484, 491, 492, 494, 758, 759, 760, 562, 563, 566; 434/188, 195, 196, 207, 189, 205, 206, 208, 304

(56) References Cited

U.S. PATENT DOCUMENTS

| | | |
|---|---|---|
| 396,381 | 1/1889 | Yaggy .................. 434/269 |
| 569,358 | 10/1896 | Sommerfeldt ............ 33/491 |
| 1,174,689 | 3/1916 | Coleman ............... 434/196 |
| 1,776,245 | 9/1930 | Barrett ................ 33/494 |
| 2,118,773 * | 5/1938 | Ball ................... 33/1 SB |
| 2,611,193 * | 9/1952 | Davis ................. 434/196 |
| 2,635,357 * | 4/1953 | Whitlock .............. 434/304 |
| 2,926,432 | 3/1960 | Helberg ............... 434/196 |
| 2,930,146 | 3/1960 | Cassel ................ 434/196 |
| 3,608,214 * | 9/1971 | Rancati ............... 434/304 |
| 3,795,053 * | 3/1974 | Burke ................. 33/1 B |
| 4,144,657 | 3/1979 | Dumovich ............. 434/195 |
| 4,547,969 | 10/1985 | Haack ................. 33/494 |
| 4,778,390 | 10/1988 | Marans ............... 434/196 |
| 4,838,794 * | 6/1989 | Coddington ........... 434/196 |
| 5,105,544 * | 4/1992 | Ontiveros et al. ..... 33/1 SD |
| 5,881,469 * | 3/1999 | Monck ................ 33/491 |

FOREIGN PATENT DOCUMENTS

22508 * of 1908 (GB) .................. 33/491

* cited by examiner

Primary Examiner—Christopher W. Fulton
(74) Attorney, Agent, or Firm—Synnestvedt & Lechner LLP (57) ABSTRACT

A measuring and instructional device containing a base panel having a top surface and perimeter bounded by at least one edge, with the top surface having evenly spaced apart linear rulings perpendicularly disposed to the edge and defining a non-linear standard unit of measure; and a top transparent sheet having a top surface and a perimeter bounded by at least one edge, wherein the top transparent sheet top surface has evenly spaced apart linear rulings perpendicularly disposed to the long edge of the top transparent sheet and defining fractional increments of the non-linear standard unit of measure; wherein the transparent sheet is positionable over the base panel so that the fractional increments of the unit of measure may be aligned with the units of measure to demonstrate the relationship between the unit of measure and the fractional increments thereof.

20 Claims, 5 Drawing Sheets

MEASURING AND INSTRUCTIONAL RULER

CROSS REFERENCE TO RELATED APPLICATION

The present application is a Continuation-In-Part of U.S. patent application Ser. No. 08/812,529 filed Mar. 7, 1997 now U.S. Pat. No. 5,881,469, the disclosure of which is incorporated herein by reference.

TECHNICAL FIELD

This invention concerns a ruler device for use in measuring distance, for use in measuring and the construction of linear objects, for use during the instruction of linear measurement, and for use as an instrument to demonstrate the relationship between a said unit of measure and fractional increments of said standard unit of measure.

BACKGROUND ART

The concept of fractional increments of standard units of measure can be demonstrated by abstract or mathematical approaches when accompanied by visual indicia. The standard scale markings on a conventional ruler are not easily comprehended by children or persons. Young children and persons, especially those with learning impediments, have difficulty with the perception of fractional increments of a said unit of measure on a conventional ruler. For example, after the concept of ½", fourths of an inch, eighths of an inch have been presented, persons, especially young children, have difficulty with the perception of the relationship between the-fractional incremental markings because the same indicium can denote, for example, one-half inch, two-fourths, four eighths, and eight sixteenths of an inch.

Also because the fractional incremental markings on a standard ruler are of the same color, it is difficult for the learner to distinguish the markings. Although the fractional incremental markings on a standard ruler may be of gradually decreasing length which denote the decreasing size of the fractional increment, the lines of one color are not easily described to the learner. For example, when presenting the one inch mark, one states the longest lines are the inch marks. Then, when presenting the one-half inch mark, one states the next shorter lines are the one-half inch marks. Next, when presenting the one-fourth inch marks, the problem begins to present itself. If the instructor says the shortest lines are the one-fourth inch lines, the learner becomes confused. The term "shorter" is now applied to more than one set of indicia. The problem becomes even more severe when the instructor presents the eighth and 5 sixteenth inch indicia.

U.S. Pat. No. 4,614,042 to Maurer discloses an educational device for use by children and persons having learning impediments or physical handicaps. While the Maurer device provides a means for perceiving a fraction of an inch, it only shows a fraction of an inch as an extension of an inch at a given point on the device. It does not uniformly demonstrate the fractional increments throughout the entire length of the instrument. It also does not simultaneously demonstrate the relationship amongst the various fractional increments throughout the entire length of the device. Furthermore, it does not disclose the fact that the incremental markings denote multiple fractional increments of said standard unit of measure. Example: the one-half inch indicia is also the two-fourth, four-eighth and eight-sixteenth inch indicia. The Maurer device, while demonstrating a fractional part of one inch, does not demonstrate the fractional parts of twelve inches simultaneously. The Maurer device, while being a teaching aid for students, by design, would preclude its wide-spread use as a measuring device for the general populace.

SUMMARY OF THE INVENTION

This problem is alleviated with each of the fractional incremental indicia being different colors, presented independently and then aligned on top of each other. Said standard unit of measure and the fractional increments thereof are easily distinguished. It is accordingly an object of this invention to provide a ruler comprising functionally symbolic means to aid in the distinguishing of a said standard unit of measure and its said fractional increments for wide-spread use amongst students and the general populace.

It is another object of this invention to provide a ruler device for the measuring of distance and objects and to use when drawing.

It is further an object of this invention to provide an educational tool which will facilitate in the instruction for use of Conventional rulers.

It is still another object of this invention to provide a ruler of the aforesaid nature of sufficient construction and low cost that it may find wide-spread use amongst educators and persons.

These objects and advantages of this invention will be apparent from the following description.

The above and other beneficial objects and advantages are accomplished in accordance with the present invention by a measuring and instructional ruler comprised of:

a base panel having a top surface, having a standard unit of measure delineated thereon; and at least one transparent sheet having fractional increments of said standard units of measure delineated thereon;

wherein said transparent sheet is positionable over said base panel so that said delineated fractional increments of said standard unit of measure are aligned with said delineated unit of measure indicia to demonstrate the relationship between said unit of measure and the fractional increments thereof.

Said ruler can be used to measure distance between two points, to measure objects, or in the construction of a linear object. Said base panel may be used independently, or said transparent sheets may be positioned over said base panel so that delineated fractional increments of said unit of measure are aligned. Said ruler can then be used to measure distance, construct linear figures, and measure objects to said fractional increment of said unit of measure.

Said instructional ruler can be used as an educational tool to facilitate in the instruction of use of conventional rulers. Said ruler can be utilized as a demonstrational tool or as a measuring device in all circumstances which call for a measuring device such as elementary schools, technical schools, trade schools, prison, adult, and abilities educational programs or in any situation where there is a need for a ruler.

BRIEF DESCRIPTION OF THE DRAWINGS

For a fuller understanding of the nature and objects of this invention, reference should be had to the following detailed description taken in connection with the accompanying drawings forming a part of this specification and in which similar numerals of reference indicate corresponding parts in all the figures of the drawings.

BEST MODE OF CARRYING OUT THE INVENTION

Referring to FIGS. 1–6, a ruler device of this invention is shown comprised of a base panel 10 and multiple top sheets 11, 12, 13, 14, all panels being of substantially integral monolithic construction, the base panel having been fabricated of wood, cardboard, transparent or opaque plastic sheet stock, the multiple top sheets having been fabricated of transparent plastic sheet stock. Base panel 10 having upper and lower faces 15 and 16, respectively, and having an elongated rectangular perimeter bounded by parallel straight upper and lower long edges 17 and 18, respectively, and straight short leading and trailing edges 19 and 20, respectively. Said upper face of base panel is provided with numbered linear rulings 21 perpendicularly disposed to upper long edge 17 and defining said standard unit of measure subdivision regions 22 having visual indicia delineated thereon.

In the illustrated embodiment, said standard units of measure are inch units. In other embodiments, said standard units of measure may be metric.

In other embodiments, lower long edge 18 of said base panel 10 may be of a curved configuration comprising one or more circular openings.

Referring to FIGS. 2a–2e, top sheets 11, 12, 13, 14, having flat upper and lower faces 23, 24, 25, 26, 27, 28, 29, 30, respectively, have elongated rectangular perimeter bounded by parallel straight upper and lower long edges 31, 32, 33, 34, 35, 36, 37, 38, and straight short leading and trailing edges 39, 40, 41, 42, 43, 44, 45, 46, respectively.

Figure 2A:
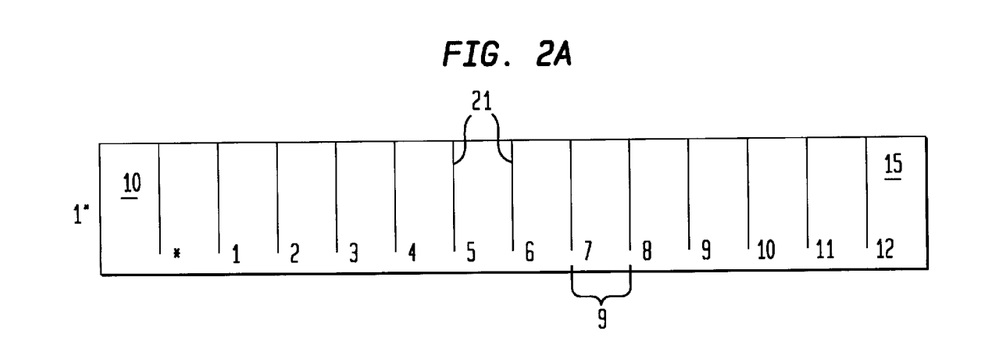
FIGS. 2a–2e are top plan views of said base panel and four transparent sheets which are positionable over the base panel so that standard unit of measure indicia are aligned with fractional incremental indicia of standard unit of measure.
Figure 2B:
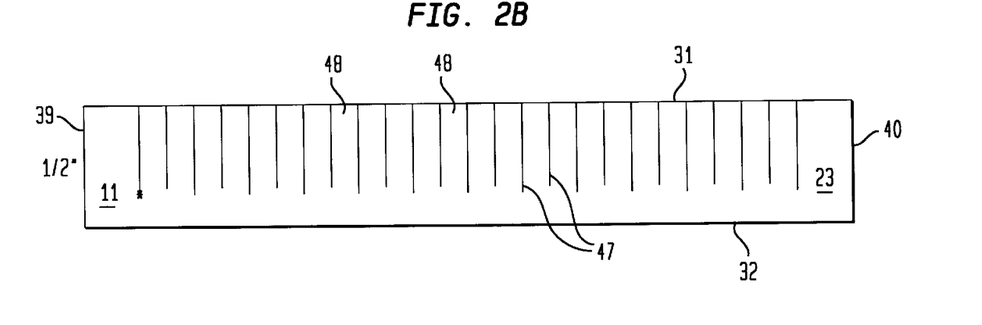

Said upper face 23 of top sheet 11 is provided with solid linear rulings 47 perpendicularly disposed to upper long edge 31, and defining ½" wide subdivision regions 48.

Figure 2C:
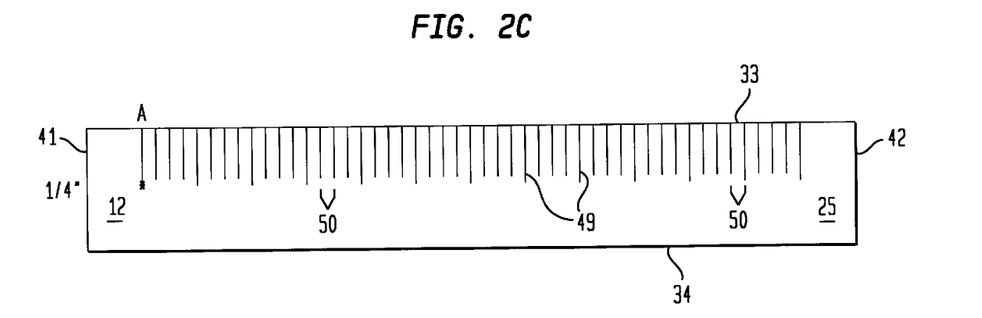

Said upper face 25 of top sheet 12 is provided with solid linear rulings 49 perpendicularly disposed to upper long edge 33 and defining ¼" wide subdivision regions 50.

Figure 2D:
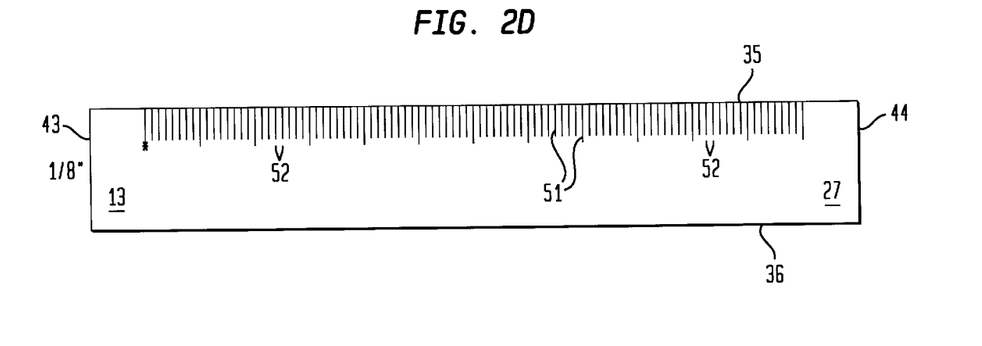

Said upper face 27 of top sheet 13 is provided with linear rulings 51 perpendicularly disposed to upper long edge 35 and defining ⅛" wide subdivision regions 52.

Figure 2E:
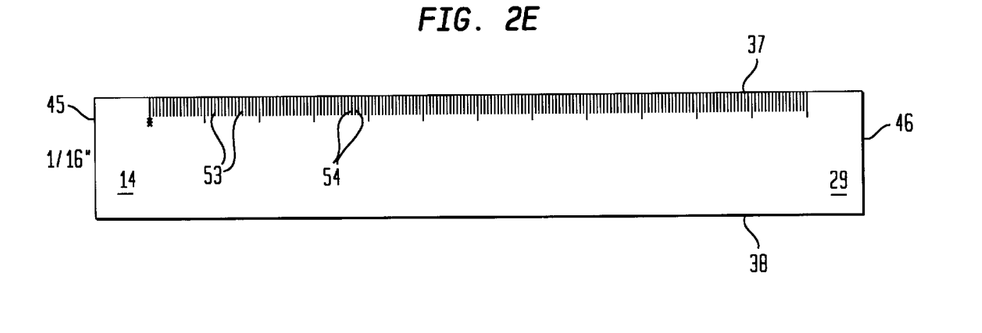

Said upper face 29 of top sheet 14 is provided with linear rulings 53 perpendicularly disposed to upper long edge 37 and defining ¹⁄₁₆" subdivision regions 54.

In the embodiment shown in FIGS. 2a–2e, the linear rulings 21, 47, 49, 51, 53 on upper faces 15, 23, 25, 27, 29, respectively, define said subdivision regions of 1"(9), ½"(48), ¼" (50), ⅛" (52), ¹⁄₁₆" (54), respectively. In other embodiments, the linear rulings may define subdivision regions of decimeter, centimeter, and millimeter. The linear rulings may also define tenths and hundredths of an inch.

In another embodiment, the base panel may have units of a first standard unit of measure delineated thereon and a transparent sheet will have units of a second standard of measure delineated thereon to demonstrate the relationship between the first and second standard units of measure. This embodiment may be employed to demonstrate the relationship between, for example, an English measurement, such as an inch, and a metric measurement, such as a decimeter. Inches and fractional inches may thereby be converted to their metric equivalents.

Additional transparent sheets may be provided delineated with fractional increments of either the first or second unit of measure so that the relationship between either the fractional increments of the first unit of measure and the second unit of measure or the fractional increments of the second unit of measure and the first unit of measure may be demonstrated. For example, additional transparent sheets delineated with fractional units of an inch and a decimeter (i.e., centimeters and millimeters) can be used to demonstrate the relationship between the metric and English units and their respective fractional units.

Said linear markings 21, 47, 49, 51, 53 are of sequentially decreased length corresponding to said standard unit of measure and its fractional increment thereof. Linear marking 21 being the longest in length. Linear marking 47 being shorter than linear marking 21. Linear marking 49 being shorter than linear marking 47. Linear marking 51 being shorter than marking 49. Linear marker 53 being shorter than linear marking 51.

Linear markings in other embodiments will be of sequentially decreased length corresponding to said standard unit of measure and fractional increments thereof.

Said linear markings 21, 47, 49, 51, 53 are preferably of clearly distinct variant colors. Linear markings 21 are of one color, clearly distinguishable from said colors of linear markings 47, 49, 51 and 53. Linear markings 47 are of another different color clearly distinguishable from said colors of linear markings 21, 49, 51 and 53. Linear markings 49 are of still another different color clearly distinguishable from said colors of linear markings 21, 47, 51 and 53. Linear markings 51 are of a further different color clearly distinguishable from said color of linear markings 21, 47, 49 and 53. Linear markings 53 are of one further different color clearly distinguishable from said color of linear markings 21, 47, 49 and 51.

Said standard unit of measure subdivision regions will be delineated within linear markings 47, 49, 51, 53 of said transparent sheets 11, 12, 13, 14 by means of a thicker linear marking of same length and color as said linear markings on said transparent sheets.

In other embodiments, said linear markings of said unit of measure and fractional increments thereof may be of distinct variant color and thickness, and clearly distinguishable from each of said other linear markings comprised in said embodiment.

Said transparent sheets are positionable over said base panel so that said delineated fractional increments of said unit of measure may be aligned with said delineated unit of measure to demonstrate the relationship between unit of measure and the fractional increments thereof.

Said base panel 10 and said base panel sheets 11, 12, 13, 14 may be secured by means of rivets, ring binders, conventional book binding, heat laminating, living hinge, snaps, velo binding, velcro, repositionable adhesive, or any other means by which two or more parts of an item can be bound. Said base panel 10 and said transparent sheets 11, 12, 13, 14 may not be bound. Said base panel 10 may be used independently or in conjunction with said transparent sheets 11, 12, 13, 14 in any various combinations.

Figure 1:
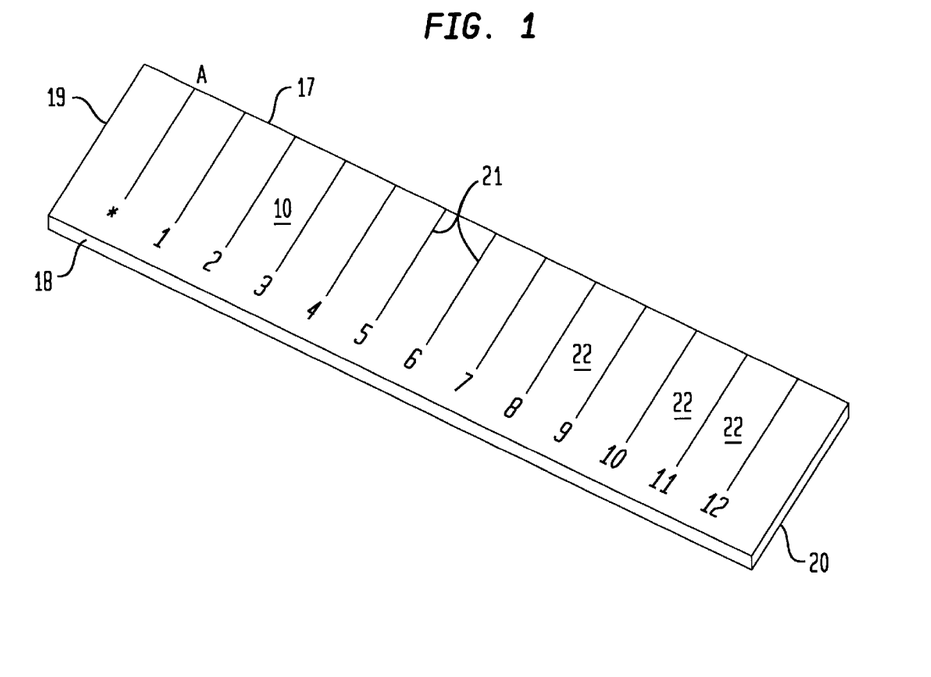
FIG. 1 is a top plan view embodiment of said base panel component of a ruler of this invention.

In use, said base panel as shown in FIG. 1 may and can be presented independently.

Figure 3:
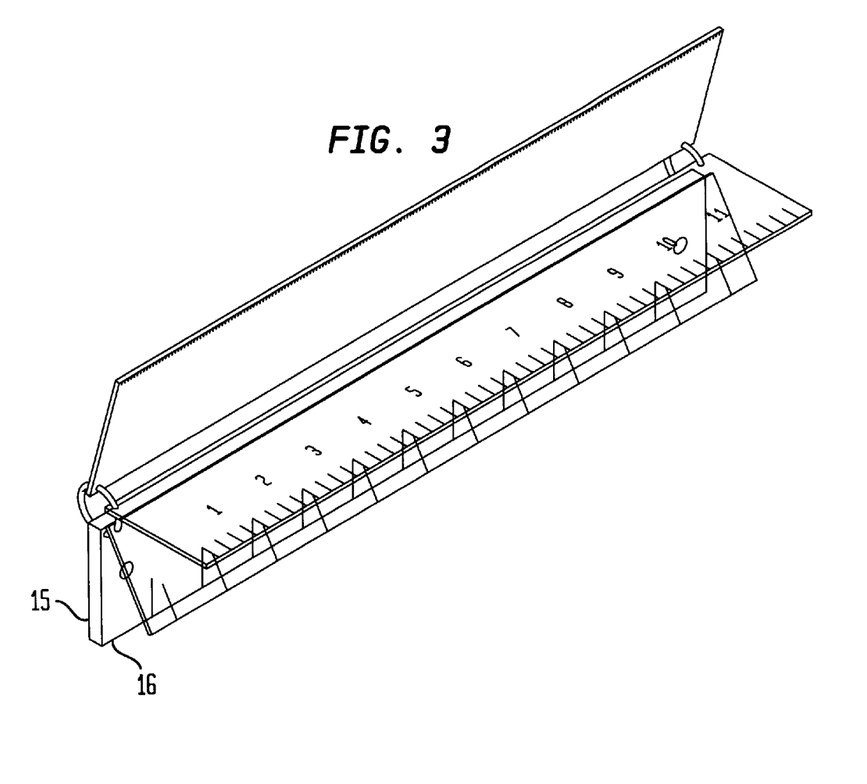
FIG. 3 is an exploded view of said ruler of this invention in operative mode using the components of FIGS. 1, 2b, 2c, 2d and 2e.
Figure 4:
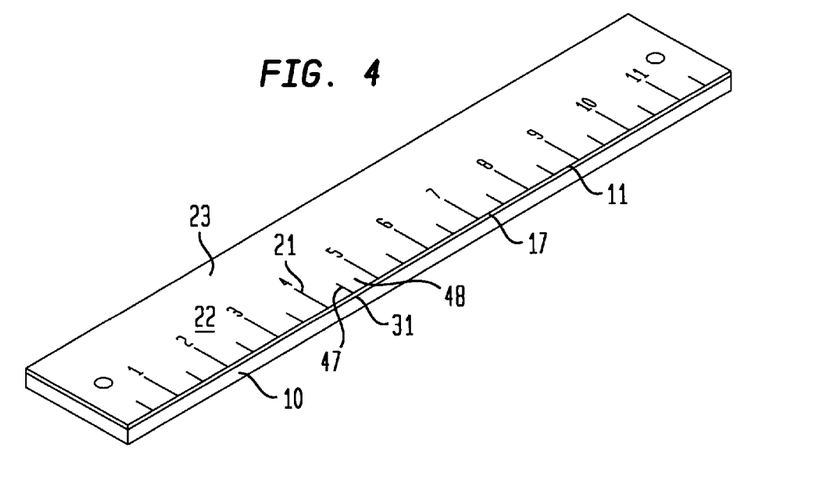
FIG. 4 is an alternative embodiment of said base panel from FIG. 1 and said transparent sheet 2b from FIG. 2.

The user positions object on zero line indicia (denoted with visual indicia A in FIG. 1, B as in FIG. 4), then measures to the nearest whole standard unit of measure. Said transparent sheet 11 can/may then be positioned over said base panel 10 as shown in FIGS. 3 and 4, so that said fractional linear markings on said transparent sheet and said standard unit of measure linear markings on said base panel are aligned beginning with zero line indicia A on base panel 10 and zero line indicia on transparent sheet 11. User positions object on zero line indicia and measures to nearest fractional increment of said standard unit of measure.

Figure 5:
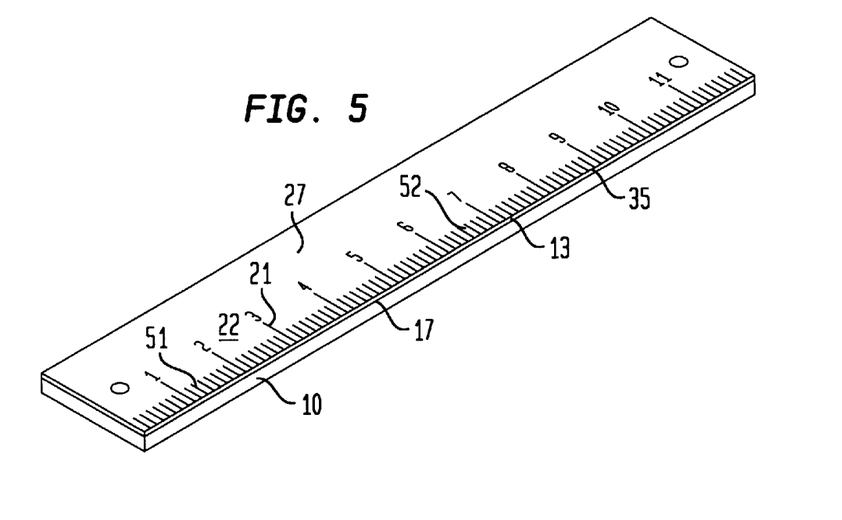
FIG. 5 is a top plan view of a further alternative embodiment of said base panel from FIG. 1 and said transparent sheet 2d of FIG. 2.
Figure 6:
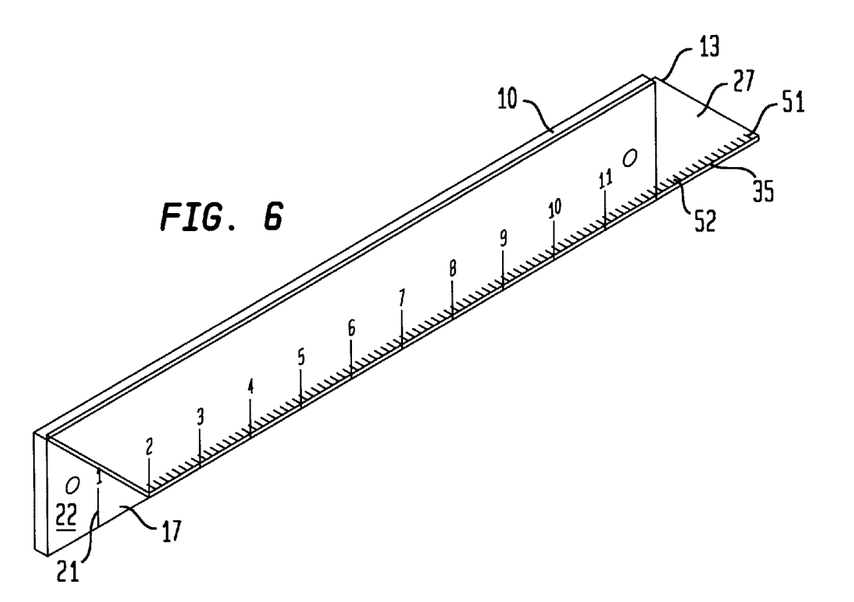
FIG. 6 is an alternative exploded view of said ruler of this invention in operative mode using the components of FIG. 1 and 2d from FIG. 2.

This procedure may/can be repeated until user has positioned Said transparent sheets 12, 13, 14 over said base panel 10 and said transparent sheet 11, as shown in FIGS. 5 and 6.

The standard unit of measure need not be a linear unit of measure. For example, the base panel may be delineated with standard units of time (such as hours), volume (such as gallons or liters) or incremental angular units of measure. One or more transparent sheets can then be delineated with fractional units of time (such as half-hours, quarter-hours or minutes), volume (cups, pints, quarts, half gallons or deciliters), or angular units of measure.

For volume, when the base panel is delineated with gallons, one or more transparent sheets may be delineated with metric units such as liters and deciliters to demonstrate how gallons can be converted to metric equivalents. Additional transparent sheets may be delineated with fractional units of gallons to demonstrate how cups, pints, quarts and halfgallons are related, and how these units can be converted to metric equivalents. Alternatively, the base panel can be delineated with metric units such as liters with the transparent sheets delineated with English units and fractional units thereof for purposes of conversion, with additional transparent sheets delineated in fractions of liters to demonstrate the relationship to liters and for comparison to the English units.

For angular measurement, the base panel can represent a 180° semicircle, preferably in the form of a protractor, with transparent sheets delineated in fractional units thereof, such as single degrees and units of ten degrees. A transparent sheet may be delineated in radians to demonstrate the relationship between degrees and radians. Alternatively, the base panel can represent a 180° semicircle delineated in single degrees and units of ten degrees typically found on a protractor, and the transparent sheets may then be delineated in trigonometric functions such as sine, cosine, tangent and the like, to demonstrate the relationship between the trigonometric functions as a function of angle size, and to permit the rapid and accurate determination of trigonometric functions for any given angle.

For measurement of time, the base panel can be circular and represent a clock face with the familiar twelve hourly delineations. A transparent sheet may be delineated in five minute units to demonstrate how the twelve delineations simultaneously represent hours and minutes. Other transparent sheets may be employed delineated in half- and quarter-hours to demonstrate these fractional relationships.

FIGS. 1 and 2a–e thus may also represent a ruler delineated with units of volume. Linear rulings 21 of base panel 10 may define gallons, with linear rulings 47 of top sheet 11 representing half-gallons, linear rulings 49 of top sheet 12 representing quarts, linear rulings 51 of top sheet 13 representing pints and linear rulings 35 of top sheet 14 representing cups. Alternatively, linear rulings 51 and 53 may be delineated to represent liters and deciliters.

Figure 7:
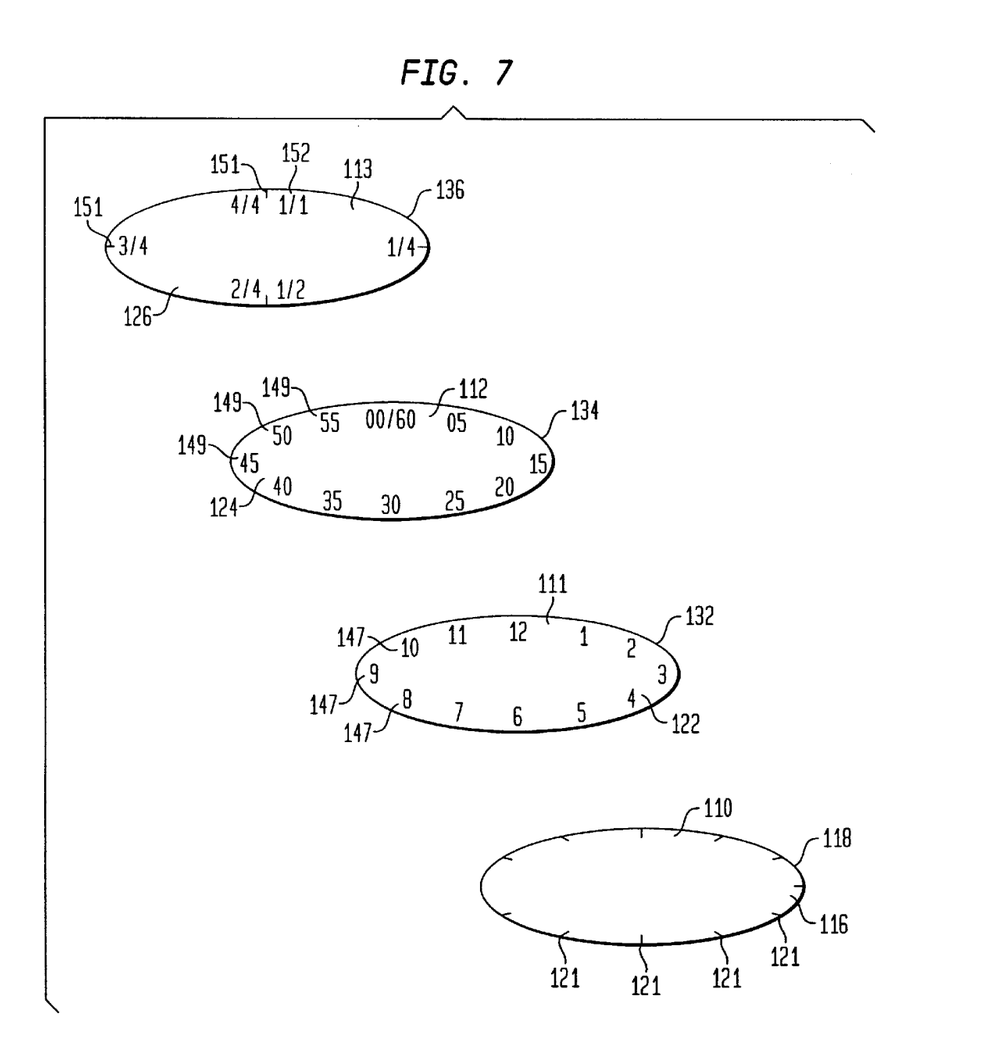
FIG. 7 is a perspective view of another embodiment of the present invention.

FIG. 7 depicts a clock face 110 having a circular perimeter bounded by edge 118. The face 116 of base panel 110 is provided with linear rulings 121 perpendicularly disposed to edge 118 and delineating the familiar twelve markings that simultaneously represent hours and minutes. Top sheets 111, 112, 113 have circular perimeters bounded by edges 132, 134, 136, respectively. Upper face 122 of top sheet 111 is provided with numerical indicia 147 demonstrating the hours of the day that correspond to each marking. The upper face 124 of top sheet 112 is provided with numerical indicia 149 demonstrating the minutes of the hour represented by each marking. Upper face 126 of top sheet 113 is provided with linear rulings 151 perpendicularly disposed to edge 136 and defining quarter-hours subdivision regions identified by fractional indicia 152.

Alternatively, the device of FIG. 7 can be employed to demonstrate the relationship between units of angular measurement and trigonometric functions. In this embodiment of the invention, the face 116 of base panel 110 is provided with linear rulings 121 perpendicularly disposed to edge 118 and defining the degrees of a circle. Numerical indicia identify the degree value corresponding to each linear marking is also included. Upper face 122 of sheet 111 is provided with numerical indicia depicting the radian values corresponding to the degree values depicted on the face of the base panel. Upper face 124 of sheet 112 is provided with numerical indicia depicting sine values corresponding to the degree values depicted on the face of the base panel. Upper face 126 of sheet 113 is provided with numerical indicia depicting cosine values corresponding to the degree values depicted on the face of the base panel.

This embodiment is also a useful device for teaching principles of vector calculus. A half-version of this embodiment, from zero to 180°, is useful in teaching the use of a protractor and the relationship of trigonometric functions to angles on the protractor.

Still yet another application for this embodiment of the invention is in the teaching of basic principles of navigation and direction. As in the previous embodiment, the face 116 of base panel 110 is provided with numbered linear rulings 121 perpendicularly disposed to edge 118 and defining the degrees of a circle with numerical indicia depicting the degree value for each linear ruling. Upper face 122 of sheet 111 is provided with linear rulings perpendicularly disposed to edge 132 at 0°,90°,180° and 270° of the circle and delineated with indicia identifying north, south, east and west. Upper face 124 of top sheet 112 is provided with linear rulings perpendicularly disposed to edge 134 and defining subdivisions of the linear markings of top sheet 111 corresponding to the compass points northeast, southeast, northwest and southwest. Indicia on the face 124 of top sheet 112 identifies each intermediate compass point. Upper face 126 of sheet 113 is provided with linear rulings perpendicularly disposed to edge 136 and further subdividing the subdivisions of face 124 of sheet 112 at points corresponding to intermediate compass points such as north-northeast, east-northeast, east-southeast and so forth. The face 126 of sheet 113 is also provided with indicia identifying the foregoing compass points.

This embodiment of the present invention is useful in also teaching the degrees of a circle corresponding to compass points, as well as the degrees of a circle between compass points, so that a student can readily understand the degree of a turn required to change direction of travel from first compass point to a second compass point.

This embodiment of the present invention may be modified to demonstrate fractional relationships by employing a base panel with no linear rulings or indicia and replacing the linear rulings of each top sheet with pie chart-type fractions of the base panel. One top sheet may depict a half "slice," another top sheet may depict one or more quarter "slices," including a depiction of how the half "slice" may be divided into quarter "slices," another top sheet may depict one or more eighth "slices," including a depiction of how each quarter "slice" may be divided into eighth "slices," and so forth.

The present invention includes methods by which relationships between units of volume, units of time and units of angular measurement may be demonstrated and taught with the devices of the present invention. The present invention also includes methods by which vector calculus and navigation may be demonstrated and taught using the devices of the present invention.

The foregoing description of the preferred embodiments should be taken as illustrating, rather than as limiting, the present invention as defined by the claims. As will be readily appreciated, numerous variations and combinations of the features set forth above can be utilized without departing from the present invention as set forth in the claims. Such variations are not regarded as a departure from the spirit and scope of the invention, and all such modifications are intended to be included within the scope of the following claims.

What is claimed is:

1. A measuring and instructional device comprised of:
   (a) a base panel having a top surface and a perimeter bounded by at least one edge, said top surface having evenly spaced apart linear rulings perpendicularly disposed to said edge and defining a non-linear standard unit of measure; and
   (b) a top transparent sheet having a top surface and a perimeter bounded by at least one edge, said top transparent sheet surface having evenly spaced apart linear rulings perpendicularly disposed to said edge of said top transparent sheet and defining fractional increments of said non-linear standard unit of measure;
   wherein said transparent sheet is positionable over said base panel so that said fractional increments of said unit of measure may be aligned with said units of measure to demonstrate the relationship between said unit of measure and the fractional increments thereof.

2. The device of claim 1, wherein said non-linear unit of measure is a unit of volume.

3. The device of claim 1, wherein said non-linear unit of measure is a unit of time.

4. The device of claim 1, wherein said non-linear unit of measure is an angular unit of measure.

5. The device of claim 1, wherein the standard unit of measure is an English unit.

6. The device of claim 1, wherein said standard unit of measure is a metric unit.

7. The device of claim 1, comprising at least one additional transparent sheet having a top surface and a perimeter bounded by at least one edge, each additional transparent sheet top surface having evenly spaced apart lines perpendicularly disposed to the edge of each additional transparent sheet, and defining different fractional increments of said standard unit of measure; so that each additional transparent sheet is positionable between said base panel and said top transparent sheet, so that the edge or edges of each additional transparent sheet may be aligned with corresponding edges of said base panel and said top transparent sheet with said additional transparent sheet linear rulings being visible through said top transparent sheet to demonstrate the relationship between said unit of measure on said base panel and said fractional increments on said top transparent sheet and on each additional transparent sheet.

8. The device of claim 7, further comprising at least one supplemental transparent sheet having a top surface and a perimeter bounded by at least one edge, each supplemental transparent sheet top surface having evenly spaced apart lines perpendicularly disposed to said edge of each supplemental transparent sheet and defining a different standard unit of measure for measuring the same property measured by the unit of measure of said base panel, so that each supplemental transparent sheet is positionable above said base panel so that said edges of each supplemental transparent sheet may be aligned with said edges of said base panel to demonstrate the relationship between said unit of measure on said base panel and said unit of measure on each supplemental transparent sheet.

9. The device of claim 8, wherein said standard unit of measure on said base panel is an English unit and said unit of measure on said supplemental transparent sheet is a metric unit.

10. The device of claim 8, wherein said standard unit of measure on said base panel is a metric unit and said unit of measure on said supplemental transparent sheet is an English unit.

11. A measuring and instructional device comprised of:
   (a) a base panel having a top surface and a bottom surface, and an elongated rectangular perimeter bounded by upper and lower long edges and leading and trailing short edges, said top surface having evenly spaced apart linear rulings perpendicularly disposed to said upper long edge and defining a first standard unit of measure; and
   (b) a top transparent sheet having a top surface and a bottom surface and an elongated rectangular perimeter bounded by upper and lower long edges and leading and trailing short edges, said top transparent sheet top surface having evenly spaced apart linear rulings perpendicularly disposed to said upper long edge of said top transparent sheet and defining a second standard unit of measure for measuring the same property measured by said first standard unit of measure;
   wherein said transparent sheet is positionable over said base panel so that said linear rulings defining said first standard unit of measure may be aligned with said linear rulings defining said second standard unit of measure to demonstrate the relationship between said first and second units of measurement.

12. The device of claim 11, wherein said first standard unit of measure is an English unit and said second standard unit of measure a metric unit.

13. The device of claim 11, wherein said first standard unit of measure is a metric unit and said second standard unit of measure an English unit.

14. The device of claim 11, wherein said unit of measure is a linear unit of measure.

15. The device of claim 11, wherein said unit of measure is a volumetric unit of measure.

16. The device of claim 11, wherein said unit of measure is an angular unit of measure.

17. The device of claim 11, comprising at least one additional transparent sheet having a top surface and a bottom surface and an elongated rectangular perimeter bounded by upper and lower long edges and leading and trailing short edges, each additional transparent sheet top surface having evenly spaced apart lines perpendicularly disposed to the upper long edge of each additional transparent sheet, and defining different fractional increments of said first or second standard unit of measure; so that each additional transparent sheet is positionable between said base panel and said top transparent sheet so that said upper long edge of each additional transparent sheet may be aligned with said upper long edge of said base panel and said upper long edge of said top transparent sheet with said additional transparent sheet linear rulings being visible through said top transparent sheet to demonstrate the relationship between said first and second units of measure on said base panel and said top transparent sheet and said fractional units of measure on each additional transparent sheet.

18. A measuring and instructional device comprised of:
(a) a base panel having a top surface and a bottom surface, and an elongated rectangular perimeter bounded by upper and lower long edges and leading and trailing short edges, said top surface having evenly spaced apart linear rulings perpendicularly disposed to said upper long edge and defining inch wide subdivisions of said base panel top surface and optionally including at least one non-decimal fractional increment thereof; and
(b) a top transparent sheet having a top surface and a bottom surface and an elongated rectangular perimeter bounded by upper and lower long edges and leading and trailing short edges, said top transparent sheet top surface having evenly spaced apart linear rulings perpendicularly disposed to said upper long edge of said top transparent sheet and defining decimal fractional increments of at least one inch wide subdivision of said top surface of said base panel;
wherein said top transparent sheet is positionable over said base panel so that said linear rulings defining said decimal fractional increments may be aligned with said linear rulings defining each inch wide subdivision and any non-decimal fractional increments thereof to convert said inches and non-decimal fractions thereof to decimal equivalents.

19. The device of claim 18, wherein said linear rulings of said top transparent sheet comprise linear rulings defining tenths of an inch.

20. The device of claim 18 comprising at least one additional transparent sheet having a top surface and a bottom surface and an elongated rectangular perimeter bounded by upper and lower long edges and leading and trailing short edges, each additional transparent sheet top surface having evenly spaced apart lines perpendicularly disposed to the upper long edge of each additional transparent sheet, and defining different decimal or non-decimal fractional increments of each inch wide subdivision of said base panel; so that each additional transparent sheet is positionable between said base panel and said top transparent sheet so that said upper long edge of each additional transparent sheet may be aligned with said upper long edge of said base panel and said upper long edge of said top transparent sheet, with said additional transparent sheet linear rulings being visible through said top transparent sheet to demonstrate the relationship between each inch wide subdivision and any decimal or non-decimal fractional increment thereof on said base panel and said top transparent sheet and said decimal or non-decimal fractional units on each additional transparent sheet.

\* \* \* \* \*